(12) United States Patent
Beckley et al.

(10) Patent No.: US 8,914,899 B2
(45) Date of Patent: Dec. 16, 2014

(54) DIRECTING USERS TO PREFERRED SOFTWARE SERVICES

(71) Applicant: International Business Machines Corporation, Armonk, NY (US)

(72) Inventors: Kristina Beckley, Carlisle, MA (US); Vincent Burckhardt, Clonee (IE); Yao P. A. Song, Cary, NC (US); Smriti Talwar, Clonsilla (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/652,019

(22) Filed: Oct. 15, 2012

(65) Prior Publication Data

US 2014/0109235 A1    Apr. 17, 2014

(51) Int. Cl.
*G06F 21/10* (2013.01)
*G06F 21/31* (2013.01)

(52) U.S. Cl.
USPC ........... 726/27; 726/1; 726/2; 726/3; 709/223

(58) Field of Classification Search
CPC ...................................................... H04L 67/02
USPC .......................................................... 726/27
See application file for complete search history.

(56) References Cited

U.S. PATENT DOCUMENTS

| | | | |
|---|---|---|---|
| 2005/0165656 A1* | 7/2005 | Frederick et al. | 705/26 |
| 2008/0005295 A1* | 1/2008 | Burroughs et al. | 709/223 |
| 2008/0071633 A1* | 3/2008 | Ozkan et al. | 705/26 |
| 2008/0281617 A1 | 11/2008 | Conrad et al. | |
| 2009/0119682 A1* | 5/2009 | Abdelhadi et al. | 719/318 |
| 2009/0144172 A1* | 6/2009 | Frederick et al. | 705/26 |
| 2009/0271324 A1* | 10/2009 | Jandhyala et al. | 705/80 |
| 2010/0049601 A1* | 2/2010 | Walker et al. | 705/14.38 |
| 2010/0057548 A1* | 3/2010 | Edwards | 705/14.13 |
| 2010/0125664 A1 | 5/2010 | Hadar et al. | |
| 2010/0223244 A1 | 9/2010 | Sinha et al. | |
| 2011/0010324 A1 | 1/2011 | Bolivar et al. | |

(Continued)

FOREIGN PATENT DOCUMENTS

| | | |
|---|---|---|
| WO | WO 2009/100402 A1 | 8/2009 |
| WO | WO 2010/035281 A1 | 4/2010 |

OTHER PUBLICATIONS

"WOT Trust Seal helps to improve your business", http://www.mywot.com/en/trustseal, retrieved Jun. 26, 2012, 2 pages.

(Continued)

*Primary Examiner* — Ashok Patel
*Assistant Examiner* — Gary Gracia
(74) *Attorney, Agent, or Firm* — Francis Lammes; Stephen J. Walder, Jr.; William J. Stock

(57) ABSTRACT

A mechanism is provided for directing users to preferred software services. An indication from a user for a software service that provides a function identified by the user is identified. One or more software services that provide the function identified by the user are identified and a determination is made as to whether an existing subscription is in place for a subset of the one or more software services. Responsive to the existing subscription being in place for the subset of the one or more software services, the subset of software services that have existing subscriptions are presented to the user.

20 Claims, 4 Drawing Sheets

(56) References Cited

U.S. PATENT DOCUMENTS

| | | | |
|---|---|---|---|
| 2011/0171938 A1* | 7/2011 | Daugherty et al. | 455/414.1 |
| 2011/0179176 A1* | 7/2011 | Ravichandran et al. | 709/226 |
| 2011/0213760 A1* | 9/2011 | Bardsley et al. | 707/705 |
| 2011/0214164 A1* | 9/2011 | Trossen et al. | 726/4 |
| 2011/0231821 A1 | 9/2011 | Sahni et al. | |
| 2011/0302003 A1 | 12/2011 | Shirish et al. | |
| 2011/0313950 A1* | 12/2011 | Nuggehalli et al. | 705/400 |
| 2011/0314042 A1* | 12/2011 | Nuggehalli et al. | 707/769 |
| 2012/0059917 A1* | 3/2012 | Dawson et al. | 709/223 |
| 2012/0066663 A1* | 3/2012 | Adhikary et al. | 717/104 |
| 2012/0102168 A1* | 4/2012 | Mercuri | 709/223 |
| 2012/0137003 A1* | 5/2012 | Ferris et al. | 709/226 |
| 2012/0150612 A1* | 6/2012 | Walker et al. | 705/14.31 |
| 2012/0158821 A1* | 6/2012 | Barros | 709/203 |
| 2012/0265695 A1* | 10/2012 | Tuchman et al. | 705/304 |
| 2012/0271874 A1* | 10/2012 | Nugent | 709/201 |
| 2012/0324539 A1* | 12/2012 | Rangachari et al. | 726/4 |
| 2013/0046982 A1* | 2/2013 | Suh et al. | 713/171 |
| 2013/0073403 A1* | 3/2013 | Tuchman et al. | 705/16 |
| 2013/0159992 A1* | 6/2013 | Nuggehalli et al. | 717/174 |

OTHER PUBLICATIONS

Ouf, Shimaa et al., "Business Intelligence Software as a Service (SAAS)", 2011 IEEE 3rd International Conference on Communication Software and Networks (ICCSN), May 27-29, 2011, pp. 641-649.

* cited by examiner

DIRECTING USERS TO PREFERRED SOFTWARE SERVICES

BACKGROUND

The present application relates generally to an improved data processing apparatus and method and more specifically to mechanisms for directing users to preferred software services.

As enterprises move to using software services, such as software as a service (SaaS), cloud-based solutions, or the like, for many of their computing needs, these software services create opportunities as well as interesting challenges given the new model for acquisition of software services. As software service offerings become more the norm in many types of software, users may identify software services through Internet browsing, searches, or the like. For users who work for enterprises of any size, a user may find difficulty in knowing which potential software services agree with or conflict with an existing relationship the enterprise has with a software service vendor. That is, users may find a potentially useful software service and start a trial or actually purchase the software service without knowing that there is an existing enterprise related account for that software service or an alternative to the found software service. Utilizing an unapproved software service may result in inaccurate or higher-priced access to the software service as well as a lack of connection and collaboration capability with other employees from the enterprise. Further, once access to a software service is initiated with one user, fixing incorrectly set up accounts and/or trying to transfer data from a trial software service to a software service that is used by the enterprise often creates major problems and increases cost for both the software service vendor and user of the software service. Furthermore, currently there is no good method for informing users or potential users of a given software service that the enterprise is sunsetting a particular software service subscription and moving to another software service, and then quickly getting users redirected and set up with the new software service.

Alternatively, enterprises may experience difficulty in ensuring that new software service subscriptions are set up appropriately (correct organizations, settings, taking advantage of negotiated pricing, and the like). Further, enterprises may experience difficulty in understanding usage patterns (frequency, type of use, value, or the like) for such software service subscriptions. An enterprise may also have some departmental and other software service subscriptions for which they have little or no information about who is using which software service, for what, how frequently, etc. That is, the enterprise may be at the mercy of the software service vendor to share relevant data and provide such data in a manner that may be incorporated into enterprise reporting tools across services.

SUMMARY

In one illustrative embodiment, a method, in a data processing system, is provided for directing users to preferred software services. The illustrative embodiment identifies an indication from a user for a software service that provides a function identified by the user. The illustrative embodiment identifies one or more software services that provide the function identified by the user. The illustrative embodiment determines whether an existing subscription is in place for a subset of the one or more software services. The illustrative embodiment presents the subset of software services that have existing subscriptions to the user in response to the existing subscription being in place for the subset of the one or more software services.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide for directing users to preferred software services. In the course of natural searching for and usage of software services, the mechanisms of the illustrative embodiments provide the user with access to information about software services. The mechanisms remove the need for users to interactively search for a software service or identify a software service from a list of enterprise-approved software services that performs a function required by the user. In addition to identifying one or more software services that perform a function required by the user, the mechanisms also provide important enterprise-specific announcements with regard to user-utilized software services, request feedback, rating, or the like, from the user pertaining to the utilized software services, and the like. Further, the mechanisms gather and send information back to a repository to allow for partial automation of software service portfolio maintenance, subscription tracking, usage statistics, and the like.

Figure 1:
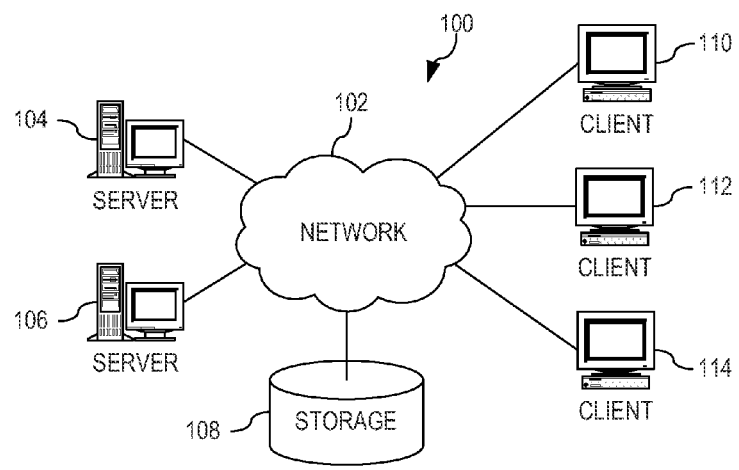
FIG. 1 is an example diagram of a distributed data processing system in which aspects of the illustrative embodiments may be implemented.
Figure 2:
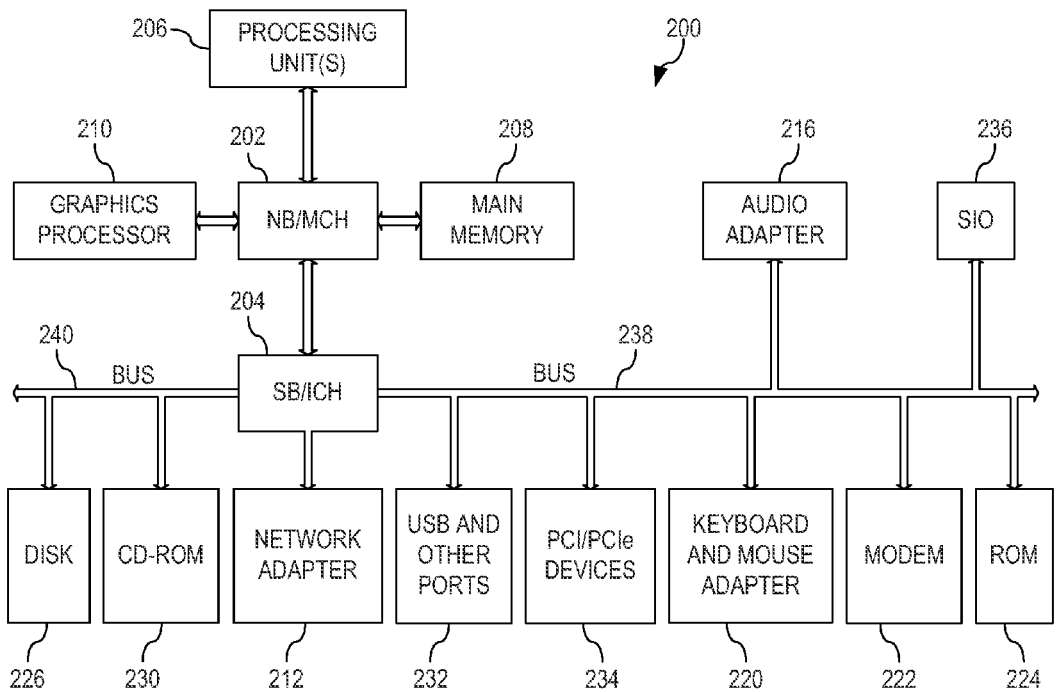
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
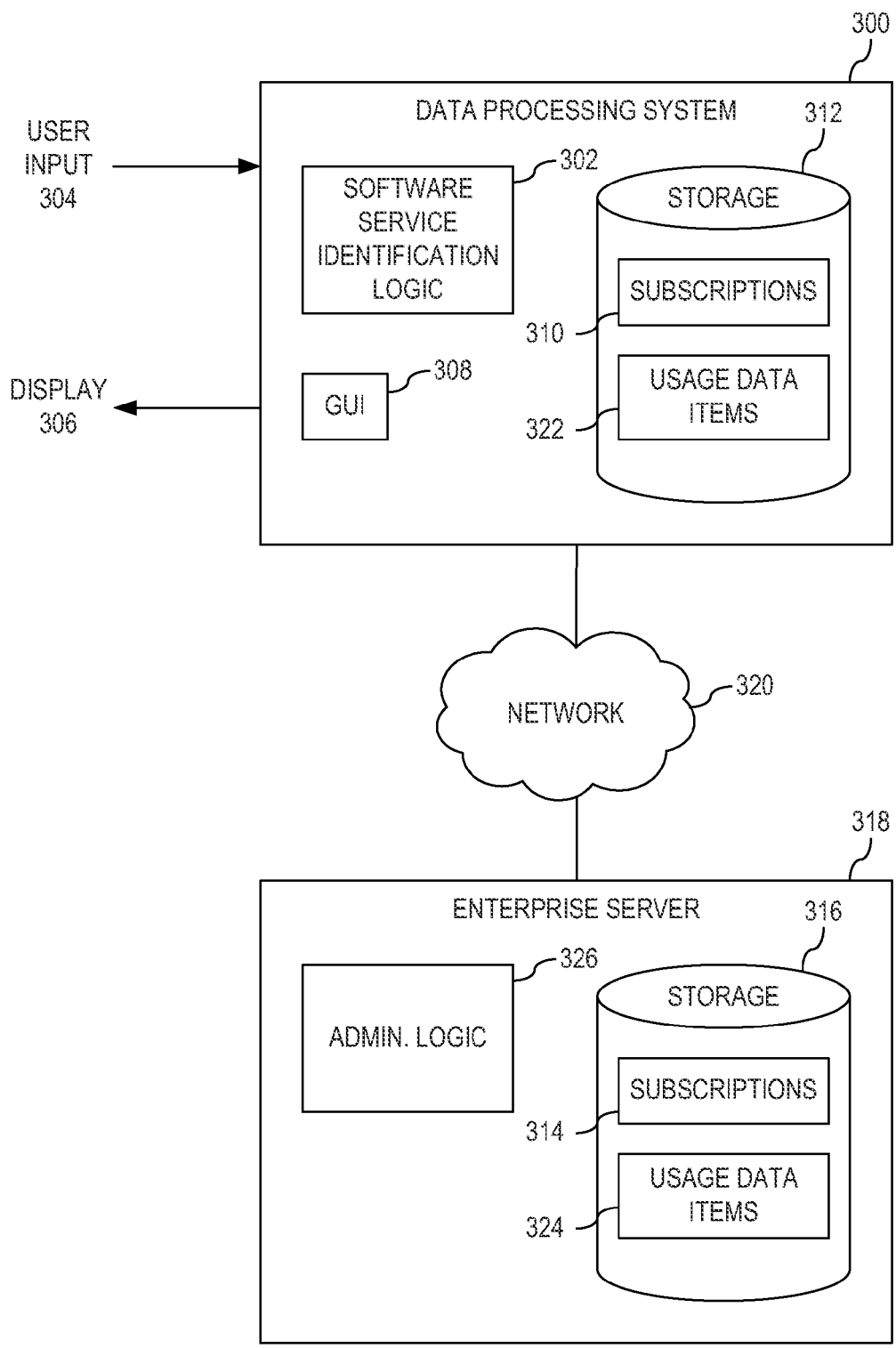
FIG. 3 depicts a function block diagram of a software service identification mechanism in accordance with an illustrative embodiment.

FIG. 3 depicts a function block diagram of a software service identification mechanism in accordance with an illustrative embodiment. Data processing system 300 comprises software service identification logic 302 which receives user input 304 and provides a response back to the user display 306 via graphical user interface 308. Responsive to the user providing user input 304 via a web browser, an explorer, directory search, or the like, software service identification logic 302, executed by a processor or processing unit such as processing unit 206 of FIG. 2, identifies whether the user input is directed to searching for a software service to fulfill a particular function the user wants to perform. Responsive to identifying that the user input is directed to identifying a software service to fulfill a particular function the user wants to perform, software service identification logic 302 identifies one or more software services via the Internet, Intranet, or the like, that provide the function identified by the user. Software service identification logic 302 then determines whether an existing subscription is in place for one or more of the one or more identified software services by searching subscriptions 310 in storage 312. An existing subscription is a subscription established by the enterprise with which the user is employed. Alternatively, if subscriptions 310 are not present in storage 312 in data processing system 300, software service identification logic 302 may determine whether an existing subscription is in place for one or more of the one or more identified software services by searching subscriptions 314 in storage 316 in enterprise server 318 via network 320. In accordance with the illustrative embodiments, subscriptions 314 may be a master repository of subscriptions updated by an administrator of the software services for the enterprise. Furthermore, subscriptions 310 may be a copy of subscriptions 314 and subscriptions 310 may replicate with subscriptions 314 on a regular basis so that when data processing system 300 is not coupled to enterprise server 318, software service identification logic 302 may operate in a normal manner.

Responsive to software service identification logic 302 identifying an existing subscription being in place for a subset of the one or more identified software services, software service identification logic 302 presents only the subset of identified software services that have existing subscriptions to the user via graphical user interface 308 and display 306. Software service identification logic 302 may also provide the user with reviews or ratings of the one or more software services by other users of the enterprise, a community of users external to the enterprise, or the like. Software service identification logic 302 may also provide usage data for the software service that identifies who within the enterprise utilizes the software service, statistic with regard to the utilization, average storage space utilized or the like. Still further, software service identification logic 302 may provide information to the user with regard other relevant information users or information technology staff have associated with the software service. However, if software service identification logic 302 fails to identify an existing subscription being in place for any of the one or more identified software services, software service identification logic 302 may present the one or more software services to the user via graphical user interface 308 and display 306.

If the user somehow circumvents the process such that the user accesses or attempts to access a software service that fails to have the existing subscription in place, software service identification logic 302 determines whether an existing subscription is in place for one or more software services that provides a function that is substantially identical to the software service being accessed or attempting to be accessed by the user. Responsive to an existing subscription being in place for one or more software services that provides the function that is substantially identical to the software service being accessed or attempting to be accessed by the user, software service identification logic 302 redirects the user to the one or more software services that provide the function and have an existing subscription. Additionally, if the user circumvents the process such that the user accesses or attempts to access a software service that fails to have the existing subscription in place and an existing subscription is in place for one or more software services that provides a function that is substantially identical to the software service being accessed or attempting to be accessed by the user, software service identification logic 302 may also provide a warning to that user indicating not to engage in certain behavior such as accessing or attempting to access the non-subscribed software service. Further, when the user is accessing a subscribed to software service, software service identification logic 302 may provide warnings to the user to not engage in certain behavior, such as posting confidential material, conduct official business on personal pages, or the like.

Responsive to a selection by the user of one software service from the subset of identified software services for access by the user, software service identification logic 302 may provide easy subscription set-up to the user by prepopulating information about being added to the subscription by pre-fills all or most of the needed forms and/or submitting the required information to procurement. Furthermore, as enterprises may cancel one subscription to one software service in view of obtaining a better deal to another software service that provides substantially identical functions, software service identification logic 302 may also provide announcements of vendor changes and easy switching by automatically subscribing the user to the new software service, moving over data, updating the data so that it works with the new software service, and the like.

Once the user has selected a software service and starts utilizing the software service, software service identification logic 302 may provide usage data about the service to an administrator, which may be stored in storage 312 as usage data item 322 or preferably sent to enterprise server 318 to be stored in storage 316 as one of a plurality of usage data items 324. Administrative logic 326 analyzes usage data items 324 to determine a number of users in the enterprise utilizing the software service over a predetermined time period so that a decision may be made as to whether it is worth maintaining a subscription to the software service as well as identifying a return on investment of the subscription to the software service. Further, when an enterprise may utilize two or more software services that provide a function that is substantially identical, administrative logic 326 may utilize the usage data items 324 for a comparative usage and thereby provide a comparison of the pricing costs per user between two similar software services.

Further, when a software service is utilized for which the enterprise fails to have a subscription, administrative logic 326 may utilize usage data items 324 that pertain to the software service to identify an interest in subscribing to the software service, identify reviews, comments, requests, or the like for a subscription to the software service, and, if a subscription is obtained for the software service, automatically add to a portfolio management system the software services already in place to the software subscription.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
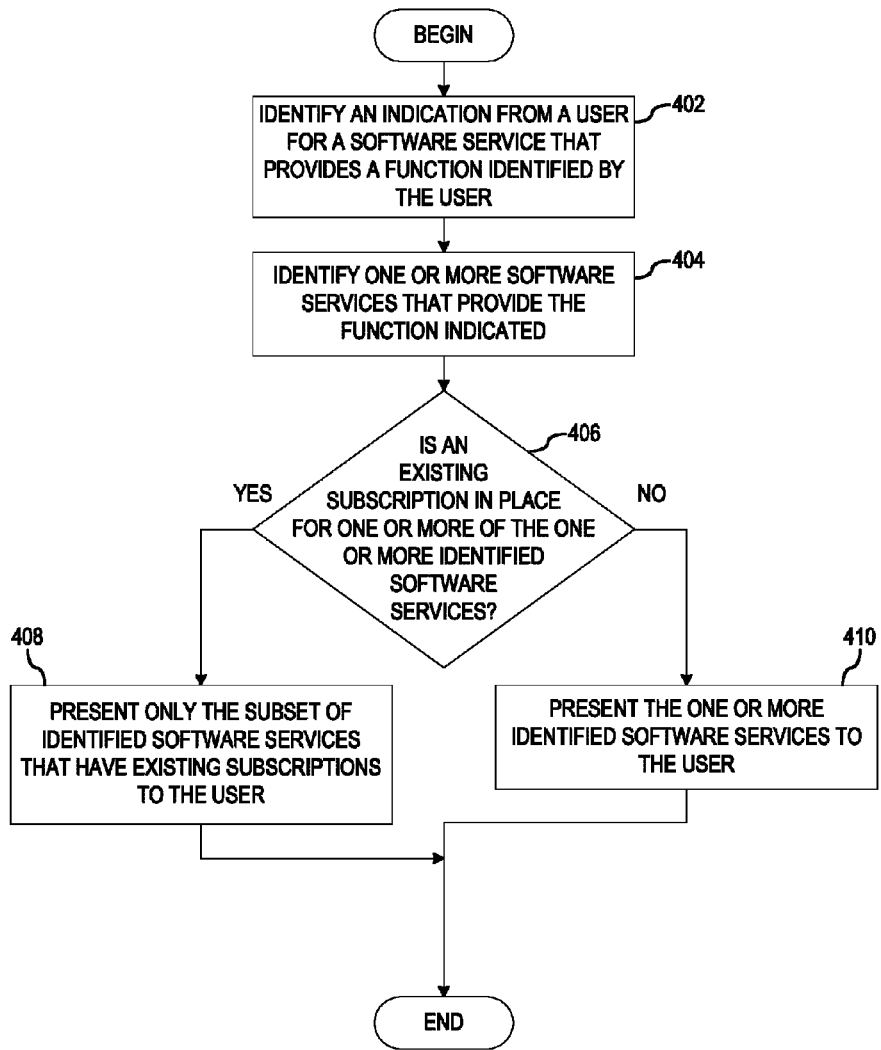
FIG. 4 depicts a flowchart of operations performed by a software service identification mechanism in accordance with an illustrative embodiment.

FIG. 4 depicts a flowchart of operations performed by a software service identification mechanism in accordance with an illustrative embodiment. As the operation begins, software service identification logic, executed by a processor or processing unit such as processing unit 206 of FIG. 2, identifies whether the user is searching for a software service to fulfill a particular function the user wants to perform, is accessing a particular software service, is attempting to access a particular software service, or the like (step 402). Responsive to identifying such an event, the software service identification logic identifies one or more software services that provide the function indicated by the search, the access, or the attempted access (step 404). The software service identification logic then determines whether an existing subscription is in place for one or more of the one or more identified software services (step 406). If at step 406 the software service identification logic identifies an existing subscription being in place for a subset of the one or more identified software services, the software service identification logic presents only the subset of identified software services that have existing subscriptions to the user (step 408), with the operation ending thereafter.

In addition to presenting the subset of identified software services, the software service identification logic provides the user with reviews or ratings of the one or more software services by other users of the enterprise, a community of users external to the enterprise, or the like. The software service identification logic also provides usage data for the software service that identifies who within the enterprise utilizes the software service, statistics with regard to the utilization, average storage space utilized or the like. Still further, the software service identification logic provides information to the user with regard other relevant information users or information technology staff have associated with the software service.

Responsive to a selection by the user of one software service from the subset of identified software services for access by the user, the software service identification logic provides easy subscription set-up to the user by prepopulating information about being added to the subscription by pre-fills all or most of the needed forms and/or submitting the required information to procurement. Furthermore, as enterprises cancel one subscription to one software service in view of obtaining a better deal to another software service that provides substantially identical functions, the software service identification logic also provides announcements of vendor changes and easy switching by automatically subscribing the user to the new software service, moving over data, updating the data so that it works with the new software service, and the like.

If at step 406 the software service identification logic fails to identify an existing subscription being in place for any of the one or more identified software services, the software service identification logic presents the one or more identified software services to the user (step 410), with the operation ending thereafter. Once the user has selected a software service, regardless of whether a subscription exists or not, and starts utilizing the software service, the software service identification logic provides usage data for the service to an administrative system.

Figure 5:
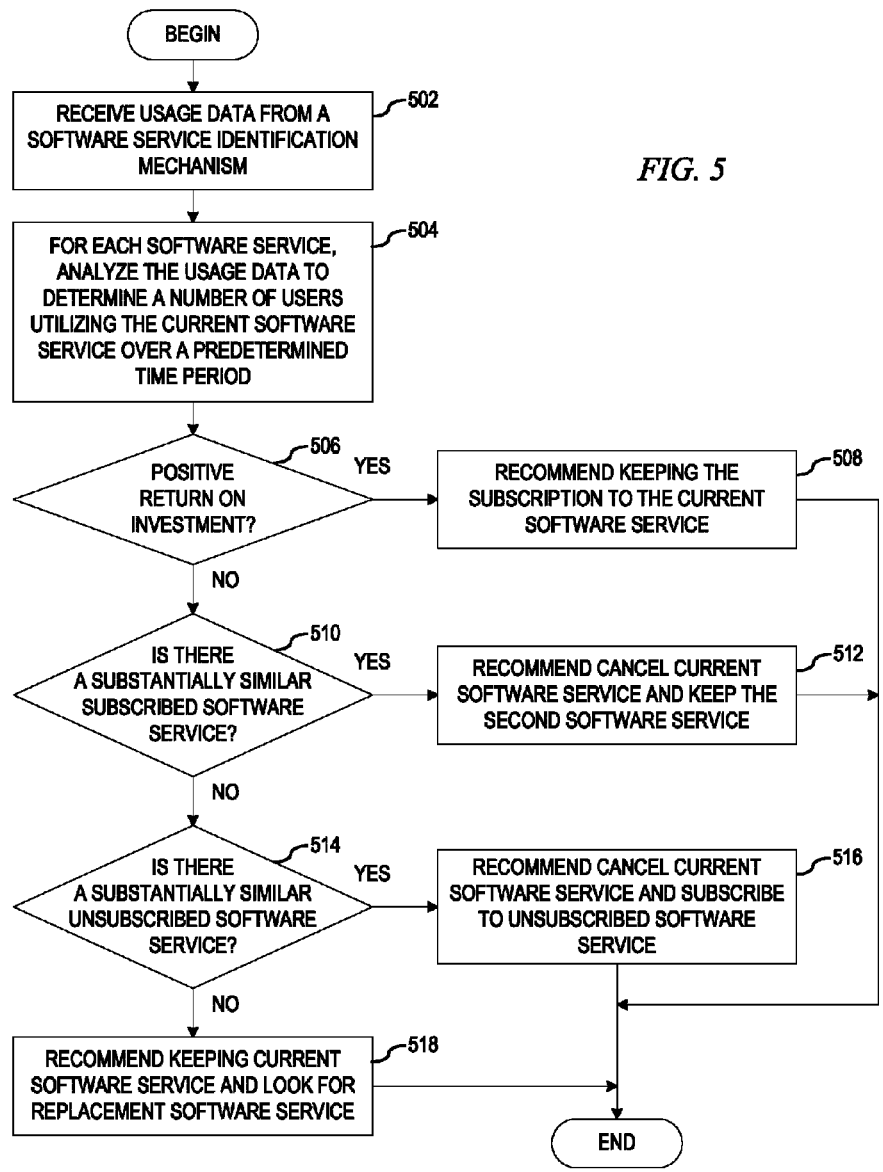
FIG. 5 depicts a flowchart of exemplary operations performed by an administrative mechanism in accordance with an illustrative embodiment.

FIG. 5 depicts a flowchart of exemplary operations performed by an administrative mechanism in accordance with an illustrative embodiment. As the operation begins, the administrative mechanism receives usage data from a software service identification mechanism (step 502). For each software service, the administrative mechanism analyzes the usage data to determine a number of users in the enterprise utilizing the current software service over a predetermined time period (step 504). The administrative mechanism then determines whether the number of users in the enterprise utilizing the current software service over the predetermined time period provides a positive return on investment (ROI) of the subscription to the software service (step 506). Is at step 506 the administrative mechanism identifies a positive ROI, then the administrative mechanism provides a recommendation to keep the subscription to the current software service (step 508), with the operation ending thereafter.

Further, since enterprises may utilize two or more software services that provide a function that is substantially identical, responsive to the administrative mechanism determining that the current software service fails to provide a positive ROI at step 506, the administrative mechanism utilizes the usage data for a comparative usage and thereby provides a comparison of the pricing costs per user between two similar software services (step 510). If at step 510 the administrative mechanism determines that there is a second subscribed software service that provides a substantially identical software service as the current software service, then the administrative mechanism provides a recommendation to cancel the current software service and keep the second software service (step 512), with the operation ending thereafter.

Further, when a software service is utilized for which the enterprise fails to have a subscription, the administrator utilizes the usage data that pertains to the software service to identify an interest in subscribing to the software service, identify reviews, comments, requests, or the like for a subscription to the software service. Thus, if at step 510 the administrative mechanism determines that there fails to be a second subscribed software service that provides a substantially identical software service as the current software service, then the administrative mechanism determines whether there is an unsubscribed software service that provides a substantially identical software service as the current software service (step 514). If at step 514 there is an unsubscribed software service that provides a substantially identical software service as the current software service and has good reviews, then the administrative mechanism recommends subscribing to the unsubscribed service and cancelling the current software service (step 516), with the operation ending thereafter. Once a subscription is obtained for the unsubscribed software service, the newly subscribed software service may be automatically added to a portfolio management system of the software services already in place to the software subscription. If at step 514 there fails to be an unsubscribed software service that provides a substantially identical software service as the current software service, the administrative mechanism recommends keeping the current software service but looking for a replacement to the software service (step 518), with the operation ending thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for directing users to preferred software services. The illustrative embodiments offer a significant advantage in terms of effectively delivering key information at a time and in a place where it is the most effective for the user and the enterprise when compared to existing services, which require the user to access separate sources and/or pages of information in an effort to find the needed information. The user having to access separate sources and/or pages is a type of requirement that is likely to result in users simply not finding the information and taking actions with incomplete and/or inaccurate information. Further, the illustrative embodiments collect usage data across all software service offerings used by user. This has the advantage over existing services in its ability to capture usage data without the need to rely on reporting from individual software service vendors where usage data may be biased or simply unavailable.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for directing users to preferred software services, the method comprising:
receiving, by a hardware implemented processor in the data processing system, a request for a software service that provides a function identified by a user;
identifying, by the hardware implemented processor, a plurality of software services;
receiving, by the hardware implemented processor, usage data for each of the plurality of software services;
for each software service of the plurality of software services:
analyzing, by the hardware implemented processor, the usage data to determine a number of users associated with an enterprise utilizing a subscribed software service over a predetermined time period;
determining, by the hardware implemented processor, whether the number of users in the enterprise utilizing the subscribed software service over the predetermined time period provides a positive return on investment (ROI) of the subscription to the subscribed software service;
responsive to identifying a positive ROI of the subscription to the subscribe software service, providing, by the hardware implemented processor, a recommendation to keep the subscribed software service;
responsive to a failure to identify a positive ROI of the subscription to the subscribed software service, determining, by the hardware implemented processor, whether there is another subscribed software service that that is substantially similar to the subscribed software service and has a positive ROI; and
responsive to another subscribed software service existing that is substantially similar to the subscribed software service that also has a positive ROI, providing, by the hardware implemented processor, a recommendation to cancel the subscribed software service and keep the other subscribed software service;
searching, by the hardware implemented processor, the plurality of software services for two or more software services that provide the function identified by the user by comparing the function identified by the user to a function provided by each of the plurality of software services;
determining, by the hardware implemented processor, whether a subscription exists in a subscription data structure on the data processing system of the user for a subset of the two or more software services that provide the function identified by the user; and
responsive to the subscription existing in the subscription data structure on the data processing system of the user for the subset of the two or more software services that provide the function identified by the user and responsive to the subset of the two or more software services each having a recommendation to be kept, presenting to the user, by the hardware implemented processor, the subset of the two or more software services that provide the function identified by the user, that have existing subscriptions, and that each have the recommendation to be kept.

2. The method of claim 1, further comprising:
responsive to the subscription failing to exist in the subscription data structure on the data processing system of the user for the subset of the two or more software services that provide the function identified by the user, determining, by the hardware implemented processor, whether a subscription exists in a master repository of subscriptions on an enterprise server coupled to the data processing system of the user for the subset of the two or more software services that provide the function identified by the user;
responsive to the subscription existing in the master repository of subscriptions on the enterprise server for the subset of the two or more software services that provide the function identified by the user, presenting to the user, by the hardware implemented processor, the subset of the two or more software services that provide the function identified by the user and have existing subscriptions; and
responsive to the subscription failing to exist for any of the two or more software services that provide the function identified by the user, presenting to the user, by the hardware implemented processor, the two or more software services that provide the function identified by the user.

3. The method of claim 2, further comprising:
providing, by the hardware implemented processor, access data as to which of the two or more software services presented to the user are accessed by the user.

4. The method of claim 1, further comprising:
responsive to the user attempting to access a software service that provides the function identified by the user and fails to have the subscription in either the subscription data structure on the data processing system or a master repository of subscriptions on an enterprise server coupled to the data processing system, determining, by the hardware implemented processor, whether a subscription exists for a software service that provides a function that is substantially identical to the function provided by the software service attempting to be accessed by the user; and responsive to the subscription existing for the software service that provides the function that is substantially identical to the function provided by the software service attempting to be accessed by the user, redirecting, by the hardware implemented processor, the user to the software service that provides the function that is substantially identical to the function provided by the software service attempting to be accessed by the user.

5. The method of claim 1, further comprising:
responsive to a selection by the user of one software service from the subset of the two or more software services that provide the function identified by the user for access by the user, prepopulating, by the hardware implemented processor, one or more fields within an access form required for accessing the one software service with information obtained from the subscription to the software service.

6. The method of claim 1, wherein presenting the subset of two or more software services that provide the function identified by the user and have existing subscriptions to the user further comprises:
presenting, by the hardware implemented processor, ratings associated with each of the subset of the two or more software services that provide the function identified by the user and have existing subscriptions to the user, wherein the ratings are at least one of ratings by other users within an enterprise with which the user is employed or ratings by other users who have used the software service.

7. The method of claim 1, further comprising:
providing, by the hardware implemented processor, usage data for each of the subset of the two or more software services that provide the function identified by the user and have existing subscriptions.

8. The method of claim 1, further comprising:
responsive to another subscribed software service failing to exist that is substantially similar to the subscribed software service or that fails to have a positive ROI, determining, by the hardware implemented processor, whether there is an unsubscribed software service that that is substantially similar to the subscribed software service and has an interest of one or more users in the enterprise;
responsive to the unsubscribed software service that that is substantially similar to the subscribed software service and has positive reviews existing, providing, by the hardware implemented processor, a recommendation to cancel the subscribed software service and subscribed to the unsubscribed software service; and
responsive to the unsubscribed software service that that is substantially similar to the subscribed software service failing to exist or having negative reviews, providing, by the hardware implemented processor, a recommendation to keep the subscribed software service and look for a replacement software service.

9. A computer program product comprising a non-transitory computer readable storage medium having a computer readable program stored therein, wherein the computer readable program, when executed on a computing device, causes the computing device to:
receive a request for a software service that provides a function identified by a user;
identify a plurality of software services;
receive usage data for each of the plurality of software services;
for each software service of the plurality of software services:
analyze the usage data to determine a number of users associated with an enterprise utilizing a subscribed software service over a predetermined time period;
determine whether the number of users in the enterprise utilizing the subscribed software service over the predetermined time period provides a positive return on investment (ROI) of the subscription to the subscribed software service;
responsive to identifying a positive ROI of the subscription to the subscribed software service, provide a recommendation to keep the subscribed software service;
responsive to a failure to identify a positive ROI of the subscription to the subscribed software service, determine whether there is another subscribe software service that that is substantially similar the subscribed software service and has a positive ROI; and
responsive to another subscribed software service existing that is substantially similar to the subscribed software service that also has a positive ROI, provide a recommendation to cancel the subscribed software service and keep the other subscribed software service;
search the plurality of software services for two or more software services that provide the function identified by the user by comparing the function identified by the user to a function provided by each of the plurality of software services;
determine whether a subscription exists in a subscription data structure on the data processing system of the user for a subset of the two or more software services that provide the function identified by the user; and
responsive to the subscription existing in the subscription data structure on the data processing system of the user for the subset of the two or more software services that provide the function identified by the user and responsive to the subset of the two or more software services each having a recommendation to be kept, present to the user the subset of the two or more software services that provide the function identified by the user, that have existing subscriptions and that each have the recommendation to be kept.

10. The computer program product of claim 9, wherein the computer readable program further causes the computing device to:
responsive to the subscription failing to exist in the subscription data structure on the data processing system of the user for the subset of the two or more software services that provide the function identified by the user, determine whether a subscription exists in a master repository of subscriptions on an enterprise server coupled to the data processing system of the user for the subset of the two or more software services that provide the function identified by the user;
responsive to the subscription existing in the master repository of subscriptions on the enterprise server for the subset of the two or more software services that provide the function identified by the user, presenting to the user the subset of the two or more software services that provide the function identified by the user and have existing subscriptions; and
responsive to the subscription failing to exist for any of the two or more software services that provide the function identified by the user, present to the user the two or more software services that provide the function identified by the user.

11. The computer program product of claim 9, wherein the computer readable program further causes the computing device to:
  responsive to the user attempting to access a software service that provides the function identified by the user and fails to have the subscription in either the subscription data structure on the data processing system or a master repository of subscriptions on an enterprise server coupled to the data processing system, determine whether a subscription exists for a software service that provides a function that is substantially identical to the function provided by the software service attempting to be accessed by the user; and
  responsive to the subscription existing for the software service that provides the function that is substantially identical to the function provided by the software service attempting to be accessed by the user, redirect the user to the software service that provides the function that is substantially identical to the function provided by the software service attempting to be accessed by the user.

12. The computer program product of claim 9, wherein the computer readable program further causes the computing device to:
  responsive to a selection by the user of one software service from the subset of two or more software services that provide the function identified by the user for access by the user, prepopulate one or more fields within an access form required for accessing the one software service with information obtained from the subscription to the software service.

13. The computer program product of claim 9, wherein the computer readable program to present the subset of two or more software services that provide the function identified by the user and have existing subscriptions to the user further causes the computing device to:
  present ratings associated with each of the subset of the two or more software services that provide the function identified by the user and have existing subscriptions to the user, wherein the ratings are at least one of ratings by other users within an enterprise with which the user is employed or ratings by other users who have used the software service.

14. The computer program product of claim 9, wherein the computer readable program further causes the computing device to:
  responsive to another subscribed software service failing to exist that is substantially similar to the subscribed software service or that fails to have a positive ROI, determine whether there is an unsubscribed software service that that is substantially similar to the subscribed software service and has an interest of one or more users in the enterprise;
  responsive to the unsubscribed software service that that is substantially similar to the subscribed software service and has positive reviews existing, provide a recommendation to cancel the subscribed software service and subscribed to the unsubscribed software service; and
  responsive to the unsubscribed software service that that is substantially similar to the subscribed software service failing to exist or having negative reviews, provide a recommendation to keep the subscribed software service and look for a replacement software service.

15. An apparatus, comprising:
  a processor, and
  a memory coupled to the processor, wherein the memory comprises instructions which, when executed by the processor, cause the processor to:
    receive a request for a software service that provides a function identified by a user;
    identify a plurality of software services;
    receive usage data for each of the plurality of software services;
    for each software service of the plurality of software services:
      analyze the usage data to determine a number of users associated with an enterprise utilizing a subscribed software service over a predetermined time determine whether the number of users in the enterprise utilizing the subscribed software service over the predetermined time period provides a positive return on investment (ROI) of the subscription to the subscribed software service;
      responsive to identifying a positive ROI of the subscription to the subscribed software service, provide a recommendation to keep the subscribed software service;
      responsive to a failure to identify a positive ROI of the subscription to the subscribed software service, determine whether there is another subscribed software service that that is substantially similar to the subscribed software service and has a positive ROI; and
      responsive to another subscribed software service existing that is substantially similar to the subscribed software service that also has a positive ROI, provide a recommendation to cancel the subscribed software service and keep the other subscribed software service;
    search the plurality of software services for two or more software services that provide the function identified by the user by comparing the function identified by the user to a function provided by each of the plurality of software services;
    determine whether a subscription exists in a subscription data structure on the data processing system of the user for a subset of the two or more software services that provide the function identified by the user; and
    responsive to the subscription existing in the subscription data structure on the data processing system of the user for the subset of the two or more software services that provide the function identified by the user and responsive to the subset of the two or more software services each having a recommendation to be kept, present to the user the subset of the two or more software services that provide the function identified by the user, that have existing subscriptions, and that each have the recommendation to be kept.

16. The apparatus of claim 15, wherein the instructions further cause the processor to:
  responsive to the subscription failing to exist in the subscription data structure on the data processing system of the user for the subset of the two or more software services that provide the function identified by the user, determine whether a subscription exists in a master repository of subscriptions on an enterprise server coupled to the data processing system of the user for the subset of the two or more software services that provide the function identified by the user;
  responsive to the subscription existing in the master repository of subscriptions on the enterprise server for the subset of the two or more software services that provide the function identified by the user, presenting to the user the subset of the two or more software services that provide the function identified by the user and have existing subscriptions; and responsive to the subscription failing to exist for any of the two or more software services that provide the function identified by the user, present to the user the two or more software services that provide the function identified by the user.

17. The apparatus of claim 15, wherein the instructions further cause the processor to:
   responsive to the user attempting to access a software service that provides the function identified by the user and fails to have the subscription in either the subscription data structure on the data processing system or a master repository of subscriptions on an enterprise server coupled to the data processing system, determine whether a subscription exists for a software service that provides a function that is substantially identical to the function provided by the software service attempting to be accessed by the user, and
   responsive to the subscription existing for the software service that provides the function that is substantially identical to the function provided by the software service attempting to be accessed by the user, redirect the user to the software service that provides the function that is substantially identical to the function provided by the software service attempting to be accessed by the user.

18. The apparatus of claim 15, wherein the instructions further cause the processor to:
   responsive to a selection by the user of one software service from the subset of the two or more software services that provide the function identified by the user for access by the user, prepopulate one or more fields within an access form required for accessing the one software service with information obtained from the subscription to the software service.

19. The apparatus of claim 15, wherein the instructions to present the subset of the two or more software services that provide the function identified by the user and have existing subscriptions to the user further cause the processor to:
   present ratings associated with each of the subset of the two or more software services that provide the function identified by the user and have existing subscriptions to the user, wherein the ratings are at least one of ratings by other users within an enterprise with which the user is employed or ratings by other users who have used the software service.

20. The apparatus of claim 15, wherein the instructions further cause the processor to:
   responsive to another subscribed software service failing to exist that is substantially similar to the subscribed software service or that fails to have a positive ROI, determine whether there is an unsubscribed software service that that is substantially similar to the subscribed software service and has an interest of one or more users in the enterprise;
   responsive to the unsubscribed software service that that is substantially similar to the subscribed software service and has positive reviews existing, provide a recommendation to cancel the subscribed software service and subscribed to the unsubscribed software service; and
   responsive to the unsubscribed software service that that is substantially similar to the subscribed software service failing to exist or having negative reviews, provide a recommendation to keep the subscribed software service and look for a replacement software service.

\* \* \* \* \*